United States Patent Office 3,309,857
Patented Mar. 21, 1967

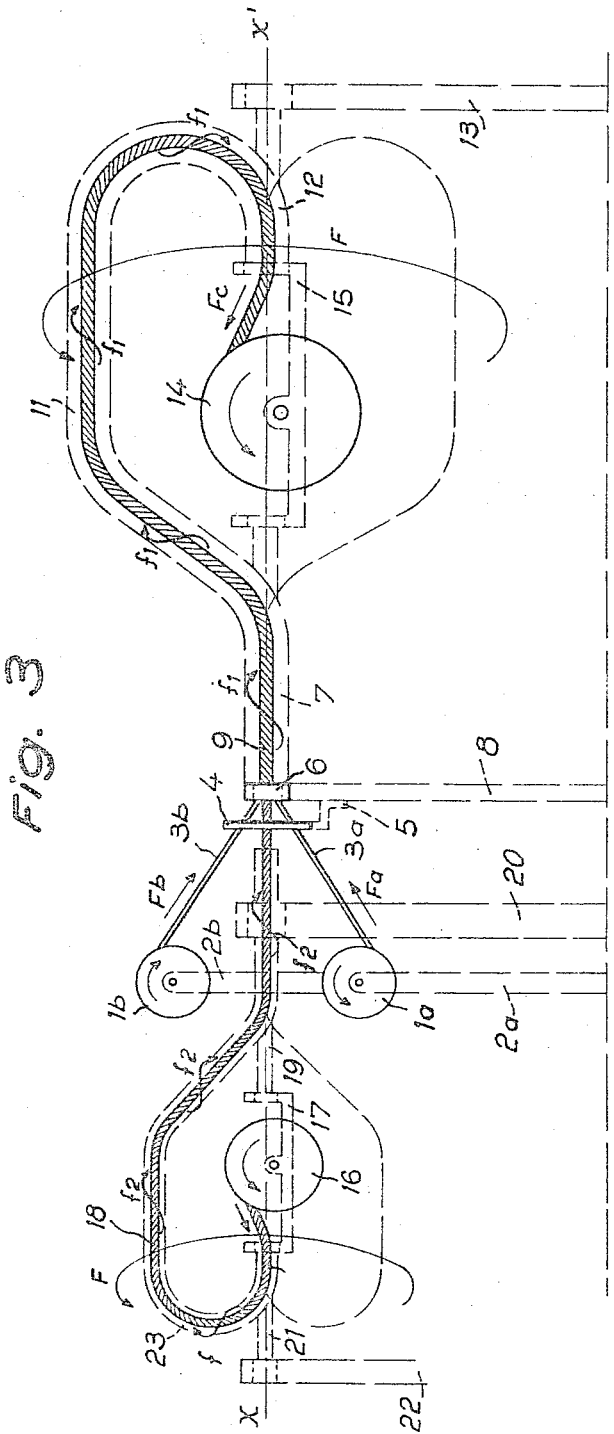

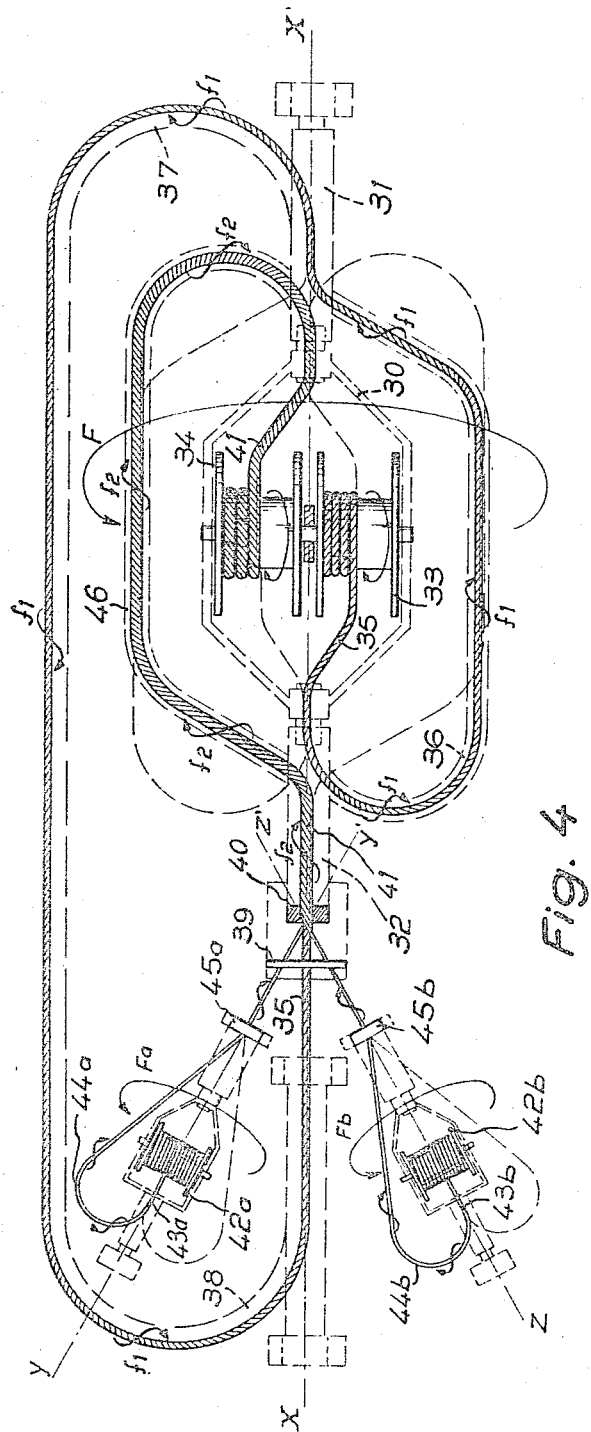

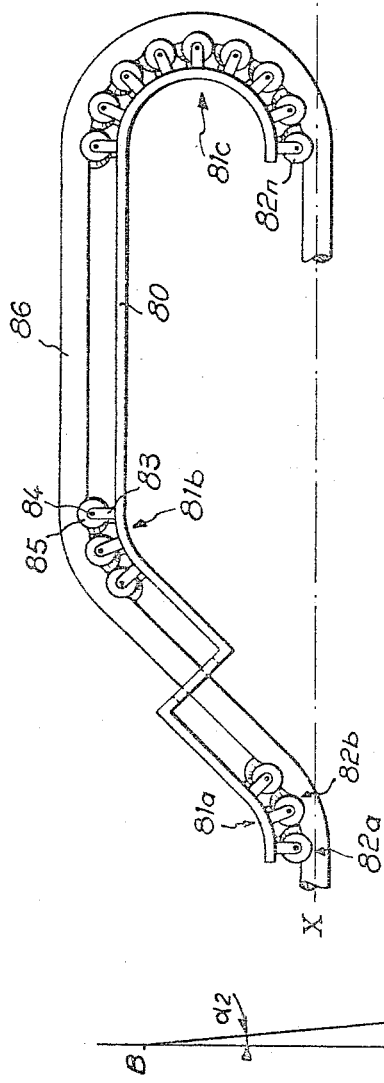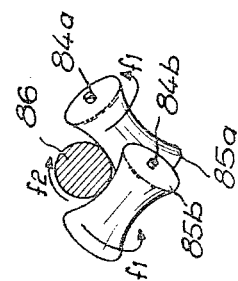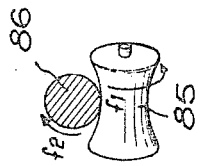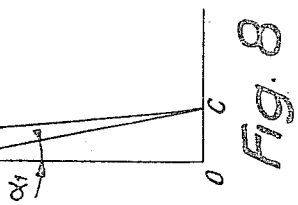

3,309,857
APPARATUS FOR PROCESSING
CABLE-LIKE ELEMENTS
Otto Haugwitz, La Celle-Saint-Cloud, France, assignor to Societe Anonyme Geoffroy-Delore, Paris, France, a French company
Filed Apr. 8, 1964, Ser. No. 358,245
Claims priority, application France, Apr. 12, 1963, 931,400; Dec. 2, 1963, 955,680
23 Claims. (Cl. 57—58.83)

This invention relates to systems useful in connection with the manufacture and processing of continuous flexible elements such as ropes and cables. It is a general object of the invention to provide improved means for controlling the degree of twist present in such a cable-like element in a more accurate, uniform and generally effective manner than was heretofore possible.

A basic cable-making process comprises feeding the component elements of a cable, such as an axial core element and outer strand elements, simultaneously through a die while rotating the elements about the axis of the die to twist them into a cable. There are two main classes of cable twisting machines operating on this principle. In a first class, that of single-twist machines, the cables elements are held fast against rotation at one end—which may be the input or the output end—and are bodily rotated about the die axis at the other end. Thus the elements are twisted directly to the desired pitch as they issue out of the die. This simple type of machine has a serious drawback in that it involves bodily rotating the heavy take-off or take-up means, such as large-diameter reels or coils at the input or output end of the machine. Due to the large masses that have to be rotated the angular speed of rotation that are permissible, and hence also the axial feed velocities, are drastically limited, imposing corresponding limits on the production rates attainable with such single-twist machines.

In the second class of twisting apparatus, the so-called double-twist machines, both the feed-out means for the cable components ahead of the die and means for taking up the resulting cable at the output end of the die are held fast against rotation about the axis of the die. The cable undergoing formation in the portion thereof beyond the die and ahead of the output coil or other take-up means is guided over a revolving frame or vane around a circuitous path which first leads it radially away from the die axis then back towards said axis, and the frame with the portion of cable thereon is subjected to a bodily rotation about said die axis. The result of this is to impart two successive twists to the cable, respectively at the input into and at the output from the revolving frame or vane, so that each revolution of the latter imparts twice as much twist to the cable as would be imparted at each revolution of a single-twist machine.

The output rate of a double-twist machine may thus be much greater than that of a single-twist machine not only because twice as much twist can be imparted to a cable for the same angular velocity of rotation, but also because the revolving structure in the double-twist machine, i.e. the revolving frame or vane, is much more lightweight than the heavy coils and reels which have to be rotated in the single-twist apparatus, and therefore can be driven at much faster rates without developing dangerously high centrifugal effects.

On the other hand, conventional double-twist machines have a serious drawback in that the resulting cables tend to lack uniformity in pitch and diameter along their length. This defect is especially marked in the case of thick many-stranded cables and is due to small differences in length which tend to arise as between the portions of the respective cable component elements or strands extending between the input and output ends of the revolving vane or frame, i.e. between the two areas in which the two components of twist are imparted to the cable in machines of this type. Such differences in length between the strands are so to speak trapped between said areas and any such difference, when it occurs, must result in a substantial increase in the thickness of the twisted cable formed in the second or downstream one of said two areas.

Another defect inherent in conventional cable twisting systems is that the feeding of the cable components into the system may tend per se to impart an undesirable twist to said components so that the resulting cable may present objectionable tendencies to kink, or on the other hand to unfurl.

Objects of this invention include the provision of improved double-twist cable machine which will be entirely free from the difficulties just noted and hence to produce cables having greatly improved characteristics including greater uniformity in diameter and pitch and freedom from residual twist in the component elements thereof.

In accordance with a basic one of its aspects, the invention provides apparatus for imparting differential rotation to spaced sections of a flexible cable-like element about the axis of the element whereby to control the degree of twist present in said element, which apparatus comprises guide means constraining the element to follow a curved path having coaxial end portions extending in a common direction, said path having at all points thereof a radius of curvature greater than the radius above which smooth bodily rotation of the element about its own axis is permitted, means for rotating the constraining means about the common axis of said end portions, and means for inducing rotation of the element about its own axis throughout the extent of said path, whereby to impart to the section of the element present at one end portion of the path an angular velocity differing from that of the section of the element present at the other end portion of the path.

It will be understood that when apparatus of this type is embodied in a double-twist cable-making machine, with the guide means of said apparatus constituting the aforementioned rotating frame or vane of such double-twist machine, the portion of cable-like element extending over the curved path defined by said frame will be revolving bodily about its own axis throughout the length of said path simultaneously as it is rotated with the frame about the axis of the die. Thus the full complement of twist, instead of being imparted in two spaced areas one ahead of and the other beyond said curved path, will be imparted wholly in a small area at the input end of said path near the input die. Any differences in length between the strands of the cable will then be easily and continuously taken up through the die without resulting in objectionable variations in the thickness and pitch of the cable.

Instead of or in addition to being used in the twisting section proper of a cable-twisting machine, the apparatus of the invention as defined above can be embodied ahead of the input die of the twisting machine as the means for supplying one, or each, of a plurality of cable components thereto. In this aspect, the invention will serve to control and/or modify the twist of any such cable component as it enters the twisting section in order, for example, to cause the component to enter the twisting section in a perfectly twist-free or inert condition, or to enter such section with a marked degree of reverse or back-twist, which may be advantageous in some cases to impart characteristics to the final cable. The above are merely examples of the possible uses of the apparatus of the invention in the cable making industry and further examples will be described in the specification. Thus, as another example, it is an important object of this invention to provide an improved system for continuously producing a multi-layer cable having alternate layers of reverse pitch and each with its own, separately predeterminable, pitch length.

More broadly the novel means for controlling the degree of twist present in a flexible cable-like element is susceptible of many different embodiments and uses, and should constitute a source from which a wide variety of new and useful machines for the cable-making and related arts will be readily designed by those familiar with such arts.

A few embodiments of the invention selected for illustration but not for limitation will now be described in detail with reference to the accompanying drawings wherein:

FIG. 3 is a similar view of an improved double-twist machine in which the invention is applied twice, once in the twisting section proper and once in the means for feeding the cable core thereto;

FIG. 4 is a schematic plan view of another form of improved double-twist machine in which the invention is applied once in the twisting section and once in each of the means for feeding outer cable components or strands thereto;

FIG. 5 is an enlarged view in longitudinal section of a revolving frame provided with roller means for inducing rotation of the cable like element about its own axis according to the invention.

FIG. 6 is a further enlarged perspective view showing in detail one of the guide roller units usable in the device of FIG. 5;

FIG. 7 is a similar view illustrating another form of guide roller unit usable in the device of FIG. 5;

FIG. 8 is a diagram useful in graphically determining the cant angle to be imparted to the guide rollers in the foregoing devices;

Figure 1:
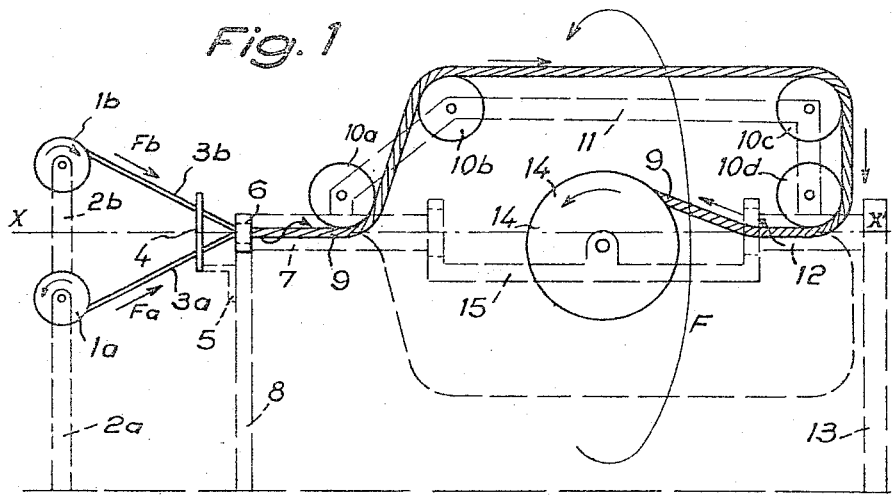
FIG. 1 is a schematic elevational view of a conventional double-twist cable making machine.

A conventional, double-twist cable-making machine is schematically illustrated in FIG. 1. In this type of machine a number of strands or elements to be twisted into a rope or cable, herein the two elements 3a and 3b, are delivered from respective take-off reels 1a and 1b rotatably mounted on supports 2a and 2b, in the directions indicated by arrows Fa and Fb. The elements are passed through a distributor grid 4 supported on a bracket 5 and then through a common input die 6 followed by a tubular shaft 7, both the die and shaft being mounted for bodily rotation in a bearing mounted on a support 8.

A preliminarily twisted rope 9 is formed at the outlet from die 7 and issues out of the far end of hollow shaft 7, and is then guided over pulleys 10a, 10b, 10c and 10d over a circuitous path which, as shown, first diverges radially away from the axis of die 6 then extends parallel to said axis and then leads back to said axis and finally extends axially inwards and back towards the die. The guide pulleys 10a through 10d are mounted for rotation on parallel transverse axes in a generally common plane containing the axis of rotation X–X' of die 6, said pulleys being carried on a common revolving frame or vane (sometimes also called a "lyre") 11 which is mounted for rotation bodily with the die 6 and tubular shaft 7 in end bearings of upright 8 and another upright 13. The direction of rotation of frame 11 around the axis X–X' is indicated by arrow F. The frame 11 includes at its end remote from tubular shaft 7 another tubuluar shaft 12 coaxial with shaft 7 and with axis of rotation X–X' and rotatable with the revolving structure. The cable or rope 9 issues out of the free end of output tubular shaft 12 and is wound around the periphery of a receiver drum 14 mounted for rotation about an axis transverse to axis X–X'. The axis of rotation of receiver drum 14 is generally stationary, the drum being for this purpose supported on a swinging frame 15 freely suspended by way of bearings around the rotating tubular shafts 7 and 12.

As indicated above the apparatus thus described is conventional. In operation, a first twist is applied to the rope or cable 9 between the outlet from die 6 and the first guide pulley 10a of the revolving frame. As a result of this preliminary twist the rope acquires a pitch which is twice the length of the desired pitch of the strands of the final rope. That is, the preliminary degree of twist imparted is one half the final twist. A second twist is imparted to the rope between the end guide pulley 10d and the receiver drum 14, as a result of which the final pitch length is provided in the rope. Every time the revolving frame, vane or lyre 11 effects one full revolution, it will be understood that the portion of rope 9 extending from the outlet of die 6 to the receiver drum 14 is twisted by an amount of two revolutions of the rope about its own axis. Hence the designation "double-twist" used to describe this type of cable- or rope-making machine.

It will be noted that in the machine just described the distance as measured along the cable in process of formation from the input guide pulley 10a to the output guide pulley 10d of revolving frame 11 is comparatively long. The guide pulleys 10a through 10d of the revolving frame structure positively hold the cable against turning and prevent rotation of the cable about its own axis over its circuitous path. Thus any differences in length between the individual strands as measured from the input die to the take-up drum cannot be freely transmitted along the considerable length of the cable extending over the revolving frame. As a result the twisted rope or cable product tends to be nonuniform along its length. These defects are especially marked when the number of component strand elements is high, and the twisting pitch short.

Figure 2:
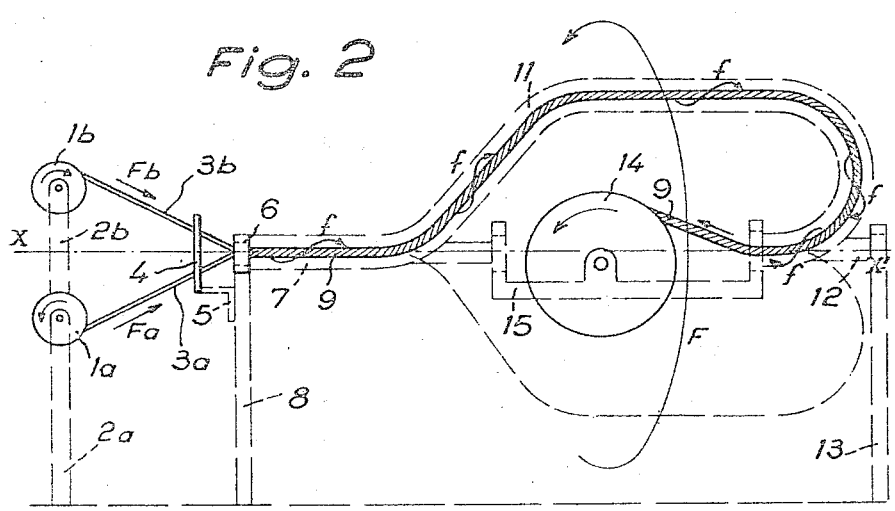
FIG. 2 is a similar view of a simple form of double-twist machine according to the invention.

These defects are overcome in the double-twist machine of the invention as illustrated in simplified form in FIG. 2. It will be seen that the general arrangement is similar to that of FIG. 1, and corresponding components are similarly designated in both figures. As will immediately appear from a comparison of FIGS. 1 and 2, a basic difference between the two machines lies in the fact that the circuitous path of the cable 9 around the revolving frame, vane or lyre 11 is free from portions having a small curvature radius. As in the conventional machine of FIG. 1, every revolution of frame 11 about the rotational axis X–X' will induce two over-all revolutions of the cable 9 about its own axis, that is, a double twist process is involved. However, because (inter alia) of the absence of highly-curved arcs in the path of the cable 9 around frame 11, as are present in the machine of FIG. 1 owing to the provision of guide pulleys 10a through 10d, the cable 9 is able to revolve freely about its own axis throughout its circuit around the frame 11, as indicated by the arrows f. Further, the invention contemplates the provision of means for promoting and/or positively producing such bodily rotation of the cable or rope about its own axis, as will be more fully described later. Hence the twisted cable or rope between the output of die 6 and receiver drum 14 behaves as a flexible element capable of freely transmitting torsion throughout its length. The twisting force is transmitted freely from the output end of the cable near receiver drum 14 back to the input end of the cable near the output of die 6, and the double-twist imparted to the cable per revolution of frame 11 is integrally applied to the cable over a small area adjacent the die 6, within the input tubular shaft 7. In other words, instead of the cable being in part twisted near the input die and in part twisted near the coiling drum, as in the prior machine exemplified in FIG. 1, with the improved double-twist machine of FIG. 2 the cable or rope receives its full twist in a single small area near the input die. Due to this fact and to the rotation of the cable about its own axis whereby torsion forces are freely transmitted over the length of the cable revolving with the frame structure 11, any differences in length as between individual strands of the cable over the said length, will not result in variations in pitch over the length of the twisted rope or cable but will be swept back rearwardly along the rope and smoothly forced back through the input die 6 without causing any variations in pitch in the portion of cable revolving with frame 11. The resulting rope or cable product will be more uniform than heretofore obtainable and free from defects.

It will be understood that the improved manner of operation just described only sets in after a certain initial number of revolutions of frame 11, and that during an induction period after the strands such as 3a, 3b have been threaded through the die 6 and frame 11 and attached to coiling drum 14, and the machine started up, the desired double-twist at the input area adjoining die 6 is not obtained. To avoid this, in a double-twisting process according to the invention, a length of auxiliary rope may be inserted through the machine and attached at one end to take up drum 14 and at its free end to the strands such as 3a, 3b. The desired operation is then obtained throughout the full length of the newly formed rope or cable.

An additional advantage of the invention is that, since the cable or rope 9 is not subjected to any twisting action beyond the short input section adjoining die 6 in which the full double twist is imparted to it, it becomes possible to feed the individual strands 3a, 3b in a completely relaxed or untwisted condition into the machine; similarly it is possible to feed together with said strands into the machine a pretwisted central core having any desired pitch length and direction, provided simply such core is rotated bodily with the strands about the axis of the rope being formed, i.e. at an angular velocity and in a direction similar to the velocity and direction of rotation of the rope in the twisting area adjoining the input die 6. To achieve this untwisting rotation for the strands and/or core elements of the rope or cable, these elements may be passed through a revolving-frame machine similar to the one described, positioned ahead of the input die of the latter.

Thus, FIG. 3 illustrates a system according to the invention for forming a double-twisted cable including a pre-twisted core. Components corresponding to components present in FIGS. 1 and 2 are designated with the same reference numerals. The system includes tow take off reels 1a and 1b rotatable on stationary axes carried by supports 2a and 2b and delivering the strands 3a and 3b as indicated by arrows Fa, Fb. The strands are passed through distributor grid 4 mounted on bracket 5 and then through input die 6 and tubular shaft 7 bodily rotatable with the die in a bearing on upright 8. The cable or rope 9 formed by twisting of the strands 3a, 3b at the output from die 6 in tubular shaft 7 issues from the shaft into the revolving frame 11 rotated about axis X–X' and having at its far end the tubular output shaft 12 bodily rotatable therewith in a bearing on upright 13, and coaxial with input tubular shaft 7. The cable issues from tubular shaft 12 towards the die and is taken up on coiling drum 14 rotatable on a stationary transverse axis supported from a cradle 15 suspended through bearings around the shafts 7 and 12.

Fed into the double-twist machine just described together with and axially of the strands 3a, 3b is a pretwisted core 18. The core 18 is fed out from a coil formed on a rotatable takeoff reel or drum 16 revolving on a stationary transverse axis supported from a cradle 17 swingingly suspended through bearings from a pair of aligned tubular shafts 19 and 21. Shafts 19 and 21 are rotatable in bearings mounted on uprights 20 and 22 respectively. The core 18, reeled off the drum 16, is passed through tubular shaft 21 and emerges therefrom radially outwardly to follow a circuitous path extending over a revolving frame 23 rotatable with the shafts 19 and 21. The path defined by frame 23 is free from small-radius portions. The core 18 extends as shown through revolving frame 23 and enters the tubular shaft 19 and thence axially through distributor grid 4 and the input die 6 of a double-twisting machine similar to the one previously described with reference to FIG. 2. The auxiliary or de-twisting frame 23 is rotated as indicated by arrow F in the same direction and at the same rate as the main double-twisting frame 11. Revolving frames 11 and 23 may be similarly constructed and fitted out with similar guiding means as will be presently described. Thus both the pretwisted core 18, and the final rope or cable 9 in process of formation are induced to rotate about their respective axes in the same direction and at a common rate as indicated by the arrows f2 and f1 respectively. It will therefore be understood that the pretwisted core 18 is not subjected to any torsion whatever as it is fed from the take-off reel 16 to the take-up reel 14. Hence also the pitch length and pitch direction of the pretwisted core 18 may be selected as desired without regard to the pitch length and direction of twist of the strands 3a, 3b of the final rope or cable.

FIG. 4 illustrates a system according to the invention for forming a double-twisted cable including a pretwisted core and untwisted strands. This system includes a stationary cradle 30 suspended by way of bearings from a pair of aligned tubular shafts 31 and 32 driven bodily in rotation through suitable means at an angular velocity N in the direction indicated by arrow F about axis X–X'. The cradle 30 supports a pair of coaxial takeoff reels or drums 33 and 34 rotatable about a transverse axis. Drum 33 carries a coil of pretwisted core 35 which on issuing from drum 33 is passed through the tubular shaft 32 and issues radially out therefrom to follow a circuitous path provided around revolving frame 36 bodily rotatable with tubular shafts 31 and 32 as indicated by arrow F. At the output end of revolving frame 36 the core 35 is fed axially outwards from the frame and is looped around a large-radius stationary arcuate guide 37, then is passed in a direction parallel to the axis X–X' and around another large-radius stationary arcuate guide 38 and is returned along the axis X–X' through a distributor grid 39 and a twisting die 40. The revolving frame 36 and stationary arcuate guides 37 and 38 are provided with guiding means later described, so arranged as to induce the pretwisted core 35 to revolve about its own axis as indicated by the arrows f1.

Reel 34 is a take-up reel for the final rope or cable 41 produced as will now be described. Reel 34 is driven in rotation about its axis through any suitable means not shown. The strand elements such as 43a, 43b (any desired number of such elements may be provided) are fed out from stationary revolving reels 42a, 42b toward and around the core 35 adjacent the input side of die 40. In their path from reels 42a, 42b to the core 35 the strands 43a, 43b are passed over looped paths on revolving frames 44a, 44b generally similar to the revolving frames 36, and rotated about respective axes Y–Y′, Z–Z′ in the directions indicated by arrows Fa, Fb at the same angular velocities as that of the frame 36. Frames 44a, 44b are provided with means which may be similar to the guide means provided on the main frame 36 as later described, for inducing rotation of the strands 43a, 43b about their axes. At their exit from frames 44a, 44b, the strands 43a, 43b pass through guides 45a, 45b respectively then through the common distributor grid 39 and die 40 for assembly around the pretwisted core 35.

At the output side of a die 40 the rope or cable 41 formed by the twisted assembly of strands 43a, 43b around the pretwisted core 35 is passed through tubular shaft 32, around a further revolving frame 46 which may be provided with rotation-inducing guiding means similar to those of the frame 36. Frame 46 is bodily rotatable with tubular shafts 31 and 32 and frame 36 at the same angular velocity N in the same direction indicated by arrow F. The cable 41 in process of formation is induced to revolve about its own axis throughout its path around the frame 46 as indicated by arrows f2.

On issuing from revolving frame 46 the cable 41 is passed into and through tubular shaft 31 in an axially inward direction and issues forth from the inner end of said shaft and through guide means (not shown) to be coiled up around the take-up reel or drum 34.

It will be apparent from the above description and explanations earlier given with reference to FIGS. 2 and 3 that the pretwisted core 35 is not revolving about its own axis at its exit from the drum 33, and revolves about its own axis at the angular velocity 2N on entering the twisting die 40. It will also be seen that the strand elements 43a, 43b, owing to the rotation of their respective frames 44a, 44b, are completely twist-free on reaching the die 40. It will finally be noted that as previously explained the outer layer of the cable comprising the strands 43a, 43b and surrounding the pretwisted core receives its full complement of twist in the small or point area immediately adjoining the output side of die 40.

Moreover in the system just described the drums or reels 33 and 34 may each serve alternately as a take-off reel for the pretwisted core and as a takeup reel for the final cable, thereby eliminating the need for substituting the reels and reducing handling operations. As many successive layers or twisted strands may in this way be applied as desired, all of equal pitch and alternating in pitch direction from one layer to the next. The pretwisted core may in turn have any desired pitch length and direction.

The rotation-inducing guide means according to the invention previously referred to as being provided in the revolving frames shown in FIGS. 2 to 4 for guiding the cable or strands around a circuitous path while inducing it to rotate about its own axis may assume various forms. Thus the guide means may be provided in the form of a simple tube having a highly polished inner surface and a diameter large enough to permit smooth rotation of the cable therein.

Another and preferred form of guide means will now be described with reference to the ensuing FIGURES 5–8.

FIG. 5 illustrates in enlarged view part of the revolving frame of a twisting machine according to the invention provided with one form of rotation-inducing guide means. The revolving frame, generally of question-mark shape, comprises a suitably shaped rigid support 80 fitted in its arcuate sections with sets of guide roller units, the sets being generally designated 81a, 81b and 81c. Each such set comprises a suitable number of guide roller units designated 82a, 82b, through 82n. Each guide unit comprises a stirrup or clevis member 83 pivotally mounted on the support 80 and supporting a crosspin 84 about which a guide roller 85 is freely pivoted, the guide roller serving to support a portion of the cable 86. As the cable 86 is fed axially forward, it imparts rotation to the guide element 85 about its crosspin 84.

The guide element 85 is shown as a simple concave roller in FIG. 6. The supporting stirrup 83 is set at an angle to the axial direction of the cable 86. As the cable 86 during its axial feed imparts rotation to the guide roller 85 in the direction shown by arrow f1, a force component is thereby created which acts on cable 86 to drive it positively in rotation about its own axis as by arrow f2.

The guide rollers may be arranged in pairs as shown in FIG. 7 to improve the lateral guidance of the cable. As shown in FIG. 7, the two rollers 85a, 85b are freely rotatable on pins 84a, 84b each secured across a related stirrup-like support, not shown, so that the axes of said pins each form an angle of say 45° with respect to the plane containing the path of feed of cable 86. As the cable 86 in its axial feed rotates the rollers 85a and 85b in the directions shown by arrows f1, there is created a force component which acts on the cable 86 to drive it positively in rotation about its axis as shown by arrow f2. The rollers 85a, 85b may be plain cylinders rather than having the concave shape shown.

The rotation-inducing guide means just described with reference to FIGS. 5–7 may be used with any of the revolving frames shown in FIGS. 2–4, and they may also be used for guiding the cable around the arcuate stationary portions of its path where required, as at 37 and 38 in the embodiment of FIG. 4.

As indicated above, the concave guide rollers are set a suitable angle to the direction of feed of the cable in order to impart positive rotation to the cable. The value of the angular setting required for best results can be predetermined by the following computation.

FIG. 8 shows a diagram used in the computation. It will first be noted that the proper setting angle is different according to how the guide roller under consideration is provided on a revolving frame wherein the cable is rotated about its own axis at a velocity N equal to the angular velocity of frame rotation, or is provided in a stationary arcuate guide means such as 37, 38 (FIG. 4) in which case the cable is rotated about its own axis at the velocity 2N. The instance of a stationary guide means will be discussed first.

In FIG. 8, the angular setting of the axes of the guide rollers with respect to the axial direction of the cable is designated $\alpha_1$. This angle is the apical angle of a right triangle OAC, wherein the base side OC equals in length the length $\pi d$ of the circumference of the cable being twisted and the altitude OA equals the pitch length $kd$ of the twisted cable, the factor $k$ representing the preselected ratio of the cable diameter $d$ to its twist pitch length is usually in the range of from 15 to 20 or so.

In the case of a guide element provided on a revolving frame, the optimum setting angle of the axis of the guide roller is designated as $\alpha_2$. This aptimum angle is the apical angle of a right triangle OBC having the same base OC as the first described and having an altitude OB equad to $2kd$, i.e. twice the altitude OA. For a given value of the ratio $k$, the angles $\alpha_1$ and $\alpha_2$ as thus defined remain constant regardless of cable diameter $d$.

The method of computation just described is conveniently applicable in most cases, but is not essential since the optimum setting angle for the guide roller axes can instead be determined by test as, for instance, in cases where the ratio of pitch to diameter and the twisting direction are variable.

Figure 9:
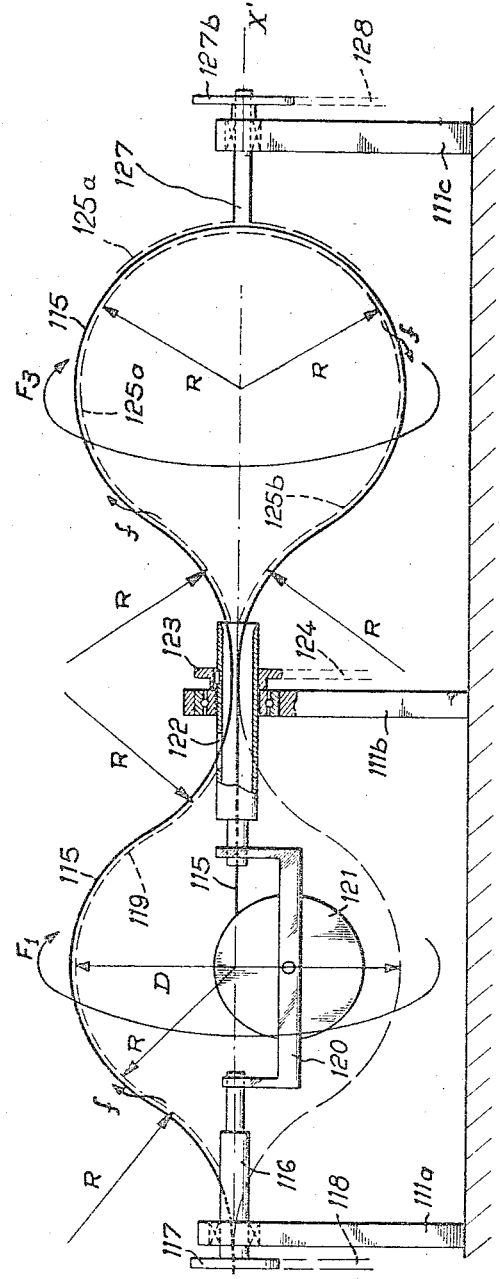
FIG. 9 is a schematic elevational view of another embodiment of a double-twist cable-making machine according to the invention whereby the curvature radius of the cable path may be maximized for given overall transverse dimensions of the apparatus.

FIG. 9 illustrates part of a cable making machine according to the invention especially useful in the manufacture of comparatively rigid cable such as large-diameter compressed network conductor cables.

Before describing this embodiment, it should be noted that in cable twisting machines of the general type to which the invention relates and including a revolving frame, "vane," or "lyre" rotatable about a takeoff or a takeup reel, it is desirable to reduce the radial or transverse dimension of the frame as far as possible since this will correspondingly reduce the centrifugal forces generated on rotation of the frame and thereby permit safe attainment of higher angular velocities and larger production rates. On the other hand, a lower limit for the permissible radial dimension of the frame is imposed by the diameter of the takeoff or takeup reel around which the frame must revolve. It is therefore evidently desirable to provide the revolving frame with a transverse of radial dimension substantially approximating the minimum imposed by the diameter of the reel inside it. The present invention, as will now be understood, introduces the further consideration that the looped path described by the rope or cable around the revolving frame should at all points present a relatively large radius of curvature in order to permit or facilitate smooth rotation of the cable about its own axis as it is fed over said path.

The embodiment of FIG. 9 now to be described has an advantage over the embodiments so far described (FIGS. 2–8) in that it provides a revolving frame having a minimum curvature radius twice as large as the minimum curvature radius present in the former embodiment, for equal maximum transverse or radial dimension of the frame. More specifically, referring for example to FIG. 2, it will be clear that in that embodiment the minimum curvature radius of the revolving frame 11, which is the radius of the arcuate section of the path at the right hand end of the frame 11, is only one half the over-all radial dimension of the frame. In the machine shown in FIG. 9 and presently described, the minimum curvature radius of the looped path is exactly equal to the radial dimension of the revolving frame, and hence twice as great as in the first embodiment of the invention.

The cable twisting system partly shown in FIG. 9 includes end and intermediate supporting uprights 111a, 111b and 111c. Mounted for rotation in end upright 111a is a tubular shaft 116 carrying a pulley 117 driven through a drive belt 118 at an angular velocity N in the direction indicated by arrow F1 from power means (not shown). Secured for bodily rotation with tubular shaft 116 is one end of a revolving frame 119 around which a cable 115 is trained. Suspended by way of a bearing around the shaft 116 is one end of a stationary cradle 120 supporting a take-up reel 121 rotatable about a transverse axis.

The intermediate upright 111b rotatably supports a further tubular shaft 122 provided with a drive pulley 123 driven through a drive belt 124 at the same angular velocity N and in the same direction as shaft 116. Shaft 122 is secured to the opposite end of revolving frame 119, and carries by way of a bearing the other end of the stationary swinging cradle 120.

A second revolving frame in the form of a complete loop having the two continuously connected sides 125a and 125b is supported for rotation about axis X–X' between the uprights 111b and 111c. The frame 125a–125b has one of its ends, that comprising the free projecting ends of the sides 125a and 125b thereof, secured for bodily rotation with the adjacent end of tubular shaft 122. At its other end, where the two sides 125a, 125b merge continuously with one another, the frame 125a–125b is secured for bodily rotation with a shaft 127 rotatable in a bearing in end upright 111c. Shaft 127 carries a drive pulley 127b rotated through a belt 128 at the same velocity N and in the same direction as shafts 116 and 122, as indicated by arrow F3.

Each of the revolving frames 119 and 125a–125b is preferably provided with series of guiding elements, not shown, which may be similar to those described with reference to FIGS. 5–7, and being such as to enable a rope or cable trained around the revolving frames to revolve freely about its own axis at all of its points. The individual strands of cable or rope such as 115 are fed into the machine from suitable sources (not shown) axially by way of tubular shaft 116, the cable is then passed as shown around the first revolving frame 119 over a path in the form of a half-loop, then axially through tubular shaft 122, around the second revolving frame 125a–125b over a path in the form of a full loop, back through tubular shaft 122 in the reverse direction, and out of the shaft to be taken up around reel 121.

It will be evident that the double-twisting machine shown in FIG. 9 will achieve a result similar to that of the other embodiments of the invention earlier described, while at the same time employing a revolving frame structure in which the radii of curvature nowhere exceed a value twice as great as that of the minimum radius of curvature of the revolving frame used, say, in the embodiment of FIG. 2, assuming the transverse radial dimension of the frames are the same.

As earlier indicated, the invention, while being of especial value in connection with the construction of rope- and cable-twisting machines, has various other uses connected with the processing of continuous, flexible, rope-like elements such as ropes and cables. Thus FIGS. 10 and 11 illustrate two alternative embodiments of unreeling mechanism for uncoiling a rope or cable from a coil thereof, and embodying the teachings of the invention for preventing the rope or cable from acquiring an undesirable twist during the uncoiling operations.

Figure 10:
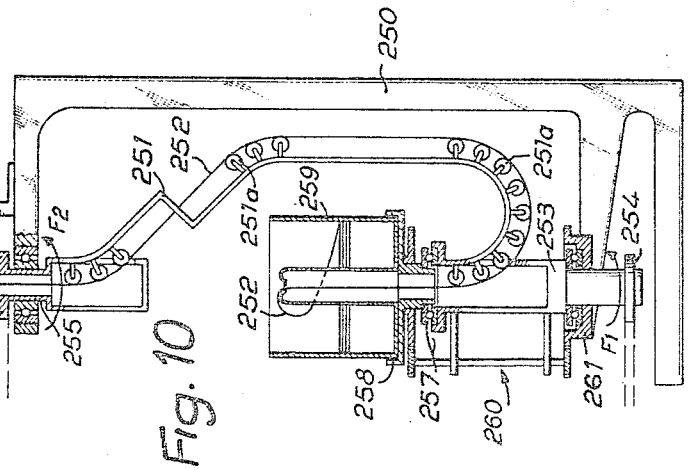
FIG. 10 is a partial view in elevation illustrating an embodiment of the invention as applied to a feed-out or take-off device for feeding a cable-like element from a coil while controlling the twist present in said element.

In FIG. 10, the unreeling mechanism comprises a fixed frame 250 having means for rotatably mounting a vertical tubular shaft 253 provided with a drive pulley 254 whereby it is rotatable by way of a drive belt in the direction indicated by the arrow F1. The frame 250 further carries at its upper end a second rotatable tubular shaft 255 coaxial with shaft 253 and driven by way of a pulley 256 and drive belt at a rate and in a direction similar to those of rotation of lower tubular shaft 253 as indicated by arrow F2. The coaxial shafts 253 and 255 are secured to the lower and upper ends respectively of a revolving frame member 251 similar to the one earlier described with reference to FIG. 5 and provided with the series of guiding elements 251a. An open-center coiling drum 259 has a flat bottom plate 258 rotatably mounted by way of a bearing 257 around lower tubular shaft 253 and contains within it a coiled rope, wire or cable 252. Planetary gearing generally designated 260 has its two sun gears secured respectively to a part 261 rigid with stand 250 and to baseplate 258, and has its planet carrier secured around tubular shaft 253 for rotating the coiling drum 259 at a predetermined rate as will presently be described.

The rope-like element 252 uncoiled from out of drum 259 through the open center thereof is trained over the circuitous path defined by the guiding elements 251a of revolving frame 251, then axially out from the upper end of the revolving frame and over stationary guide elements 262a whence it may be fed out e.g. to a distributor grid and then an input die of a cable twisting machine of any of the type earlier described herein, or other processing apparatus. In operation, rotation is imparted through pulley 254 to lower tubular shaft 253 and revolving frame 251, and when a draft force is imparted to the wire or other flexible element 252 to pull it outwardly of the upper end of said frame, the element 252 will rotate about its own axis owing to the construction of revolving frame 251 with its guiding roller elements 251a. In order to ensure that the element issuing from the apparatus is completely free from twist, it is generally found necessary to rotate the drum 259 at such a rate with respect to the angular velocity with which said element is pulled out of the apparatus, that the drum 259 effects one revolution per turn of the element 251 elements is pulled out of the apparatus, that the drum is obtained by suitably selecting the gear ratios in the planetary gearing 260.

Figure 11:
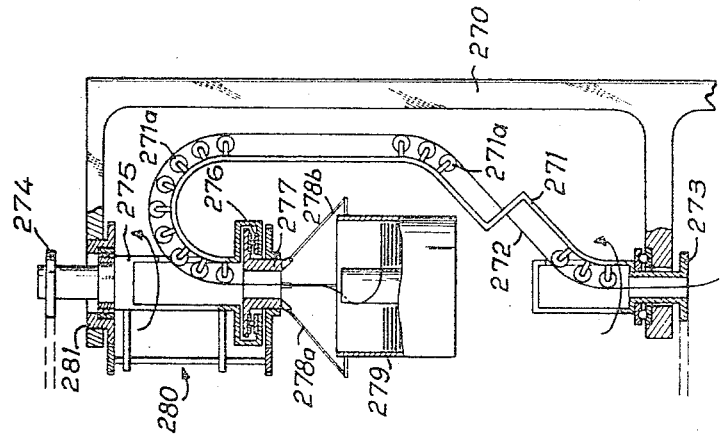
FIG. 11 is a similar view of a modified embodiment of the feed-out device of FIG. 10.

In the modified feed-out apparatus shown in FIG. 11, the general arrangement is inverted with respect to that of FIG. 10. The frame or stand 270 carries the revolving frame 271 similar to but inverted with respect to the revolving frame 251 (FIG. 10) and provided with similar guide elements 271a for for the wire- or rope-like element 272 being uncoiled. Revolving frame 271 is driven in rotation both from its lower end by way of a drive pulley 273 and from its upper end by way of a drive pulley 274, carried by the aligned lower and upper tubular shafts shown. The upper tubular shaft 275 has a tubular part 277 rotatably supported from its lower end by way of a bearing 276, and from the part 277 is suspended by way of spider arms 278a, 278b, a solid-center coil drum 279. Planetary gearing generally designated 280 is connected between a part 281 secured to frame 270 at its upper end and the part 277 to rotate the drum 279 at a predetermined relative angular velocity to ensure complete untwisting of the uncoiled element as explained in the case of FIG. 10.

The operation of the feed-out system of FIG. 11 is substantially similar to that of the system of FIG. 10 except for the fact that the feed movements are reversed and that the wire or the like 272 issues out of the lower end of the revolving frame as will be obvious from a consideration of the drawing.

It will be apparent from the foregoing that the invention makes it possible to manufacture a cable with the final pitch while subjecting the cable to twist at substantially only a single point of its length; and also makes it possible to feed a cable, wire or other element of this kind from a coil thereof in a fully untwisted or relaxed condition. These teachings of the invention when applied to the manufacture of multi-layer cables are extremely advantageous because of the high speed at which the layers can be laid providing a final cable of greatly improved uniformity and accurately cylindrical shape, which among other advantages procures a substantial savings on the amount of insulation and sheathing required.

The invention is applicable to ropes and cables of all types and sizes. The use of twist-free feed-out apparatus according to the invention as described for instance with reference to FIGS. 4, 10 or 11, greatly facilitates the successful assembly of cables composed of stiff or rigid strand elements, such as high-resistance steel wires, for reasons easily understood.

In this connection it should be noted that in some cases it may be desirable when using the feedout apparatus of the invention to adjust the apparatus in such manner as to impart to the strands or wires being fed out an untwisting effect of more than 100%; that is, the relative angular velocities are so adjusted that the strands or wires receive a degree of reverse twist exceeding the elestic limit of the wires, so that in the finished cable the strands will have a tendency to wind themselves inwards around the cable and keep the cable in a tightly packed and compressed condition, thereby counteracting the tendency of the strands to uncurl by their inherent elasticity as will otherwise occur in cables of the type referred to.

Figure 12:
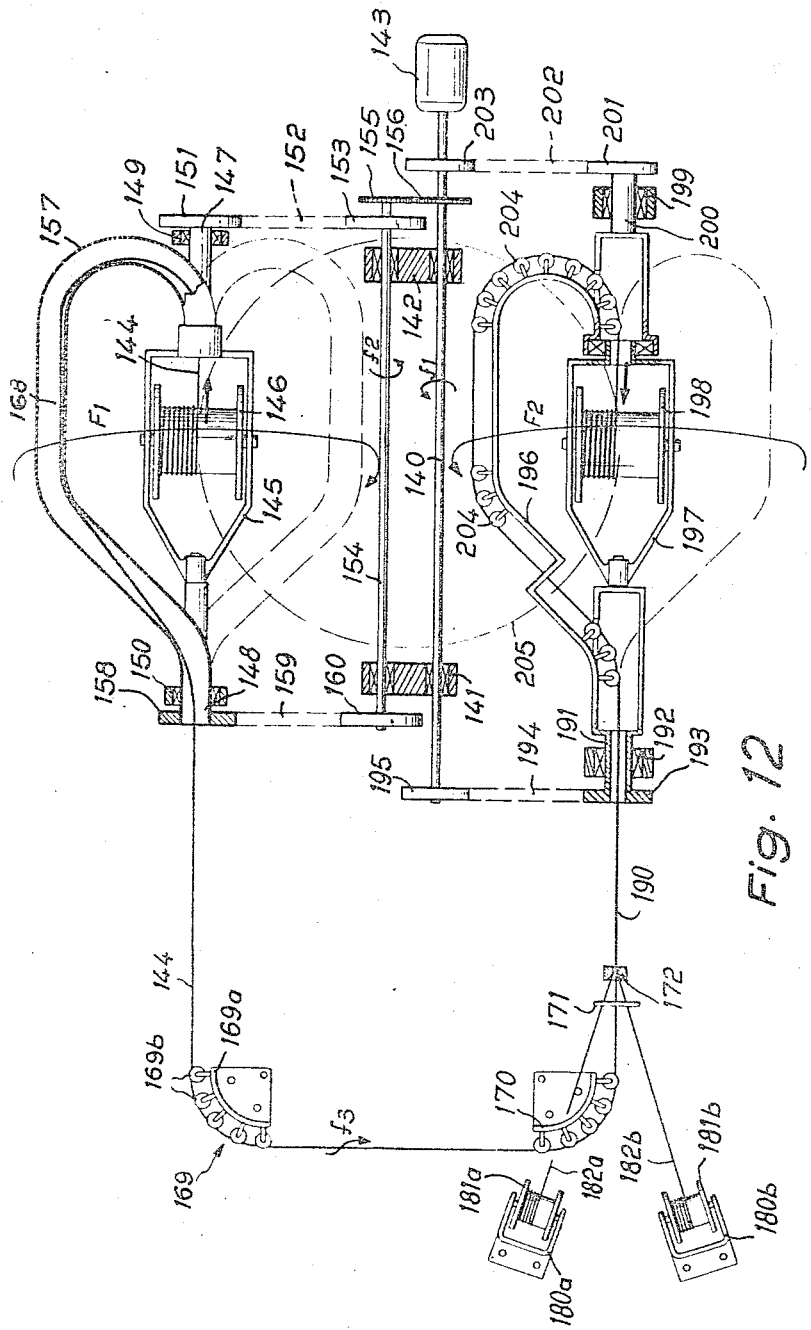
FIG. 12 is a plan view of a modified double-twist cable machine in which the invention is applied once in the twisting section proper, and once in each of the means for feeding the core and the outer components elements of the cable into said section.

FIG. 12 illustrates a cable-twisting system according to the invention which represents a modification of the system shown in FIG. 3 for forming a cable around a pretwisted core, without untwisting of the surrounding strands.

The system of FIG. 12 includes a power drive including an electric motor 143 driving a main drive shaft 140 rotatable in bearings 141, 142 in the direction shown by arrow f1. Feedout apparatus for a pretwisted cable core element 144 is provided in the form of a stationary cradle 145 carrying a feedout drum 146 rotatable about a transverse axis and carrying the coiled element 144 coiled around it. The cradle 145 is suspended through bearings 149 and 150 from a pair of aligned tubular shafts 147, 148. Tubular shaft 147 carries a drive pulley 151 rotated by a belt 152 from a pulley 153 carried by a layshaft 154 mounted in bearings 141, 142, and driven from main shaft 140 through spur gears 155, 156 so that shaft 154 rotates as shown by arrow f2 in a direction reverse from that of shaft 140. Tubular shaft 147 is secured to one end of a revolving frame of lyre 157 the other end of which is secured to tubular shaft 148. Shaft 148 carries a pulley 158 driven through a belt 159 from a pulley 160 carried by layshaft 154. Frame 157 is thus driven in rotation in the sense indicated at F1. The relative diameters of pulley pairs 151–153 and 158–160 are so selected that frame 157 is rotated at a selected angular velocity N. The revolving frame 157 is so constructed, as earlier explained, that the pretwisted core element 144 is freely rotatable thereon about its own axis, as the element 144 is fed axially over the revolving frame. For this purpose the revolving frame 157 is shown to be tubular with a smooth inner surface, but it will be understood that the frame may be provided with guide roller means if desired. At its output from the revolving frame 157 the core element 144 is revolving about its axis at an angular velocity 2N.

Core element 144 is then passed over two stationary arcuate guides 169 and 170 in succession each comprising an arcuate support 169a and an arcuate series of guide rollers 169b of type earlier described herein whereby not to impede free rotation of core element 144 about its axis at the velocity 2N in the sense indicated by arrow f3. Core element 144 then passes through a distributor grid 171 and through an assembly die 173.

Strand elements for the cable are fed out from stationarily mounted takeoff reels 181a and 181b rotatably mounted on the stationary brackets 180a, 180b. The strand elements 182a, 182b fed out from the reels are passed through distributor 171 and through die 172 beyond which they are wound around the core element 144. The resulting cable 190 beyond die 172 which is revolving about its axis at the angular rate 2N is then passed axially into a tubular shaft 191 rotatable in a bearing 192 and driven by a pulley 193 and drive belt 194 from a drive pulley 195 carried by main shaft 140.

The diameters of pulleys 193 and 195 are selected so that tubular shaft 191 is rotated at the velocity N. Shaft 191 is secured to one end of a revolving frame 196 and carries by way of a bearing one end of a stationarily suspended cradle 197 on which a receiver coiling drum 198 is mounted for rotation about a transverse axis. The opposite end of frame 196 is secured to one end of a shaft 200 aligned with tubular shaft 191 and rotatable in a bearing 199, the shaft 200 supporting by way of a bearing the other end of cradle 197. Shaft 200 carries a pulley 201 driven through a belt 202 from a pulley 203 carried by main shaft 140 at the angular velocity N. The frame 196 is thus driven synchronously from both ends at the angular rate N in the direction shown by arrow F2. The frame 196 is fitted out with guide means 204 of the type previously described for guiding the cable 190 around its looped path over the revolving frame while permitting or positively inducing rotation of the cable about its axis.

It will be apparent that, just as the system of FIG. 3, the system of FIG. 12 will permit of forming a double twisted cable about a pretwisted core 144 without imparting any undesirable additional twist to the core throughout the feed of the core from takeoff reel 146 to takeup reel 198. However, the system of FIG. 12 has the following additional advantage over that of FIG. 3. Assuming it is desired to form a large-diameter cable including a plurality of layers of twisted strands, then after a first layer of strands has been wound say about a pretwisted core 144 as just explained, the machine is stopped, both drums 146 and 198 are simultaneously lifted out of their cradles by means of suitable hoists, their positions are reversed and they are then replaced in reverse relationship in the cradles 197 and 145 respectively. The machine can then be started up again so that the cable formed in the preceding run now serves as the pretwisted core for a fresh layer of double-twisted strands. Thus a multilayer cable twisting process is greatly expedited and handling operations are reduced.

Figure 13:
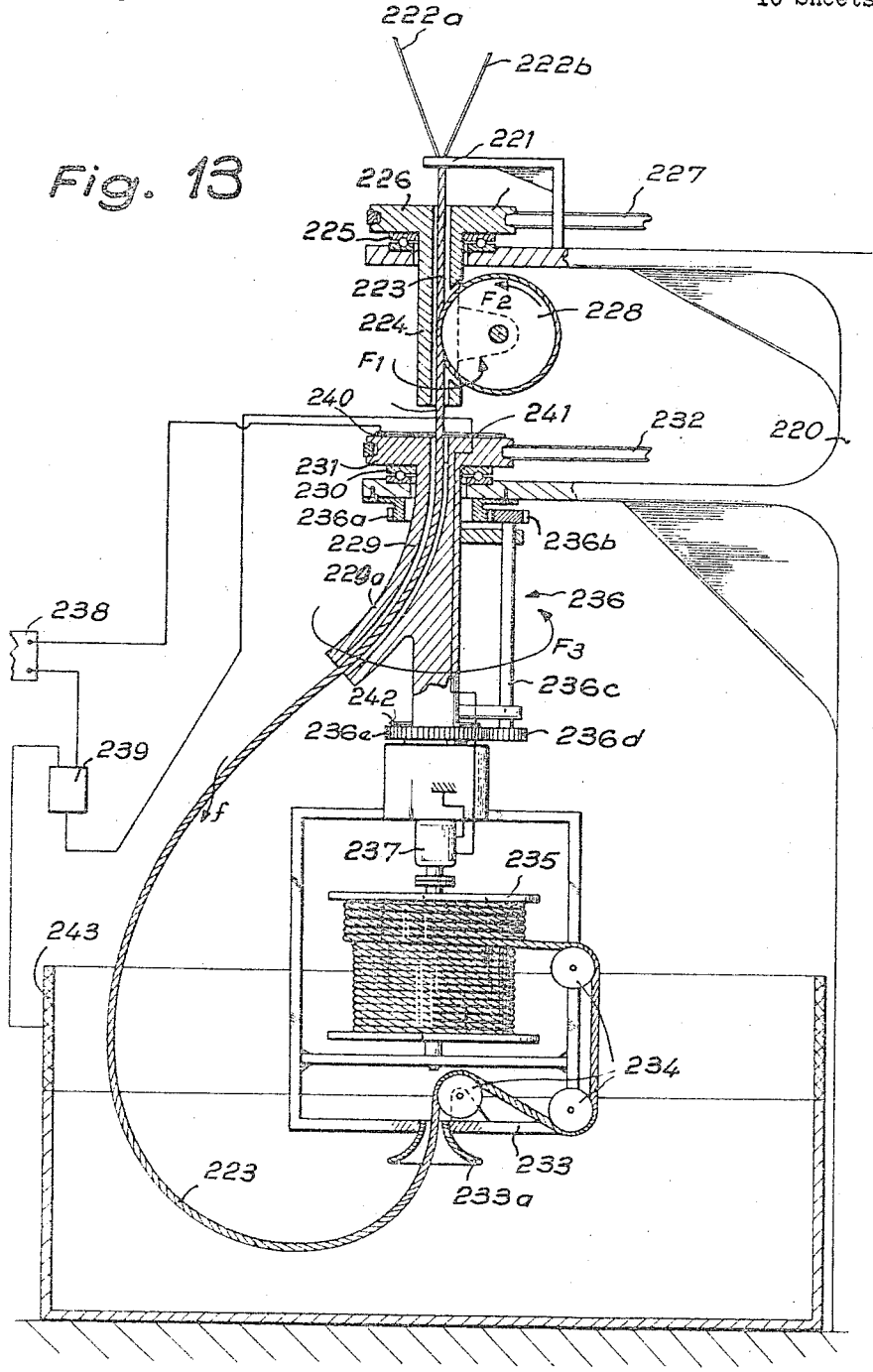
FIG. 13 is a partial vertical view of a cable-twisting machine according to another embodiment of the invention.

FIG. 13 illustrates an embodiment of a cable-twisting machine according to this invention in which the axis of rotation is vertical rather than horizontal as the forms so far described. The machine includes a frame 220 supporting at its top a die 221 into which individual strand elements such as 222a, 222b are fed from suitable sources and through a distributor grid not shown. Below the die 221 the cable in process of formation is passed vertically downwards through a vertical tubular shaft 224 rotatable in a bearing 225 of the frame 220 and carrying a pulley 226 driven through a belt 227 from drive means not shown so as to rotate the shaft in the direction shown at F1, at an angular speed 2N. Associated for rotation with tubular shaft 224 is a capstan wheel 228 arranged to engage one or more turns of the cable 223 around it, and means (not shown) are provided for rotating wheel 228 in the direction shown by arrow F2 around its axis to impart linear feed movement to the cable at a selected velocity. It will be noted that the cable in process of formation on issuing out of the input tubular shaft 224 is revolving about its own axis at the angular rate 2N.

Beyond the lower end shaft 224 the cable 223 enters a further tubular shaft 229 mounted coaxially below tubular shaft 224 in a bearing 230 and carrying a pulley 231 driven through a belt 232 at an angular speed N, i.e. one half the speed of shaft 224, in the direction indicated by arrow F3. The tubular shaft 229 defines an outwardly diverging passage for the cable so as to constitute in effect a truncated revolving frame section 229a. The cable issuing out of this passage describes a free path in space in the form of a loop as shown, the cable at the lower end of this loop being taken upwardly through a guide funnel 233a and over guide pulleys 234 to be coiled up around a reel 235 mounted for rotation about a vertical axis coaxial with the tubular shafts, in a cradle 233. The cradle 233 is suspended in generally stationary condition by way of a bearing around a lower part of tubular shaft 229, and means are provided for holding the cradle stationary during rotation of the tubular shaft, the said means comprising a planetary gearing generally designated 236. The gearing includes an upper sun gear 236a secured to fixed frame 220, a lower sun gear 236e secured to cradle 233, and a planet-carrier secured to tubular shaft 229 and carrying the bodily rotatable coaxial planet gears 236b and 236c respectively meshing with sungears 236a and 236e.

The takeup reel 235 is independently driven in rotation from an electric motor 237 supported from the cradle 233 and directly coupled to the reel shaft. Motor 237 is energizable to rotate at different speeds, e.g. a lower speed such that the reel 235 when driven at such speed will cause the cable 223 to coil up at a linear velocity lower than the linear feed velocity applied to the cable by the feeder capstan 228, and a higher speed that will cause the cable to coil up at a linear velocity higher than said linear feed velocity.

The motor 237 can be energized for either low-speed or high-speed operation by selective connection with a suitable power source 238 by way of a time-relay device 239. The details of the selective energizing circuit connections are only partly shown as including a slip ring 242 associated with lower sun gear 236e and two separate and insulated slip rings 240 and 241 associated with drive pulley 231. It will be understood that the time relay unit 239 includes within it reversing switch contacts which are normally positioned to connect the motor 237 for lower-speed operation, and are reversed, on energization of relay 239 as presently described, to connect the motor for higher-speed operation for a predetermined period of time. Time relay 239 further includes an energizing winding (not shown) which has one end connected with the power source 238 and its other end connected with a conductive limit ring 243 surrounding the lower part of the machine, so as to be contacted by the loop formed by cable 223 (assumed to be electrically conductive) when the radius of the loop exceeds a prescribed limiting value. When this occurs the said other end of the relay winding is connected through the ring 243 and conductive cable 223 to ground, whereupon the relay is energized and reverses its contacts, thereby connecting motor 237 for high-speed operation.

In the operation of this system, the cable 223 is initially inserted into the machine with adequate slack in its lower part to provide a loop of prescribed size in its free portion from the outlet of passage 229a and the inlet of funnel 233a leading into the cradle. When power is applied to the system upper tubular shaft 224 is driven at velocity 2N through drive belt 227, lower tubular shaft 229 is driven at velocity N through belt 232, and takeoff reel 235 is driven at its lower velocity from motor 237. Under the joint actions of gravity and centrifugal force the free length of cable 223 assumes the inverted question-mark shape shown. Since in this initial condition reel 235 is being rotated at a speed somewhat lower than that required for taking up the cable at the rate at which it is being fed in by capstan 228, the length of the free loop gradually increases, and the horizontal radial width of the loop increases until the cable engages the inner surface of limit ring 243. This completes an energizing circuit for the winding of relay 239 as explained above and the relay contacts are switched over to the position in which the motor 237 is driven at its higher speed, at which the cable is taken up around the reel 235 at a rate higher than its feed rate. The radius of the loop formed by the cable now decreases accordingly. This reduction in loop radius continues for a period determined by the time-setting of time relay 239 at the end of which period the relay contacts reverse to rotate motor 237 at its lower speed, and the regulating cycle described is repeated.

In this as in the other embodiments of the invention described, the cable is entirely free to rotate about its own axis throughout its circuitous or looped path, so that the full final twist is imparted to the cable entirely in a small region adjoining the output side of die 221.

In the case that the cable being formed is insulated or poorly conductive, the regulating system described may be modified accordingly. For example there may be provided a lightweight conductive ring mounted in floating relation within the limit ring 243 and normally out of contact therewith, the cable loop on attaining the prescribed radius being adapted to push said inner ring outwardly into engagement with the limit ring 243.

Figure 14:
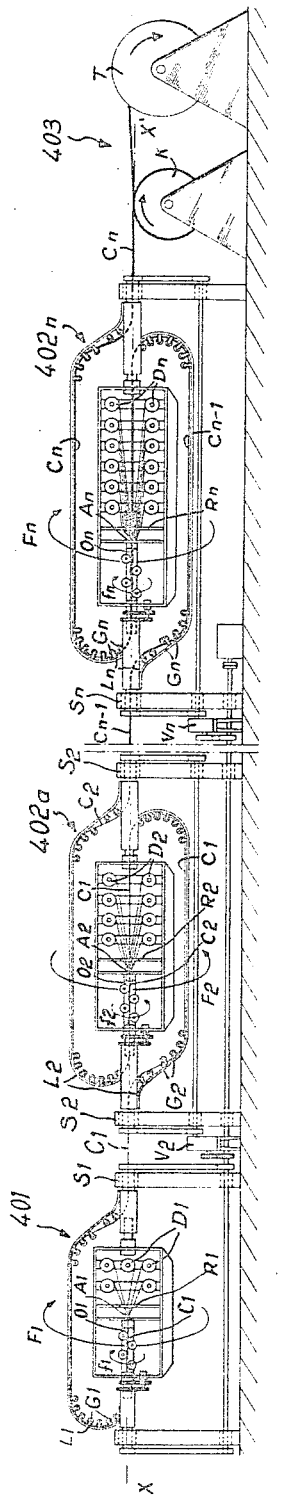
FIG. 14 is an elevational view of a multi-unit system for continuously producing a multi-layer cable according to the invention.

FIG. 14 illustrates a cable making system according to the invention for forming in a single continuous pass a multi-layer cable wherein the successive layers are laid in alternate senses and may have different unrelated pitch values. The system includes a series of double-twisting units according to the invention, including an input unit 401 and a number of intermediate units designated 402a through 402n, one less in number than the number of layers of strands to be provided in the final cable, and followed by an output or take-up assembly 403.

The input unit 401 comprises, mounted on suitable supports, a generally stationary cradle carrying a number of take off reels D1 having respective strands coiled thereon, a distributor grid R1, a die A1, optional means O1 for imparting rotation to the core C1 formed by the twisting of the strands from reels D1 about its own axis at an angular rate $2N_1$ in the direction $f1$, and a revolving frame L1 of a type similar to those earlier described herein and rotated about the axis X–X' at an angular rate $N_1$ in the same direction as indicated by arrow F1, the frame L1 being provided with the guiding roller elements G1 including rotation of the core about its own axis. The cable core C1 twisted to its final desired pitch in an area adjoining the output side of die A1 is rotated about its own axis at the angular rate $N1$ as it is fed through frame L1, and is stationary as regards its rotation about its own axis at the output from the revolving frame, between the supports S1 and S2.

The twisting unit 402a includes a similar set of reels D2 mounted in a stationary cradle, a distributor grid R2, a die A2, an optional drive device O2 for rotating the cable C2 being formed about its own axis at a rate $2N_2$ in the direction shown by arrow $f2$, around the cable core C1, and a dual revolving frame L2 driven in rotation about axis X–X' at the angular rate N2 in the same direction as shown by arrow F2, the dual revolving frame L2 being provided with guiding elements G2 whereby to guide the core C1 and the cable C2 over respective looped paths in the two portions of the dual frame L2 while permitting or forcing rotation of core C1 and cable C2 about their respective axes.

The pretwisted core C1, which as indicated above is nonrotating as it enters the first part of the dual frame L2, is rotated about its axis at the angular rate N2 as it passes through said first part of the frame and is thereafter driven in rotation with the cable C2 by means of the device O2 at the angular rate $2N_2$. The strand elements reeled off the reels D2 are twisted around the pretwisted core C1 with the desired final pitch at the output from die A2, in a direction reverse from that of the pitch in the pretwisted core. The pitch of the lay of strands in cable C2 may be independently adusted by adjusting the rate of rotation of the revolving frame L2, e.g. through a speed variator device V2. The resulting cable C2 is fed around the second part of the frame L2 while revolving about its own axis at the angular rate N2, and is stationary as concerns rotation about its axis as it leaves the frame L2 to enter the next twisting unit.

The subsequent twisting unit or units 402 are each similar to the one unit 402a just described, as shown for the final unit 402n of the series, in which parts corresponding to parts of unit 402a are designated with the same reference numerals in which the suffix $n$ is substituted for the suffix 2.

Thus the precedingly twisted cable C$n$–1 formed in the twisting unit 402($n$–1), not shown, and constituting the core element fed to the final unit 402n, is stationary in rotation on entering the first part of dual revolving frame L$n$ rotated in the sense shown by arrow F$n$, and is driven about its own axis at the rate $N_n$ in this part of the dual frame, and is driven in rotation about its axis in the sense shown by arrow $fn$ at the angular rate $2N_n$ by the driver device O$n$. The strand elements reeled off the reels D$n$ are twisted around the pretwisted core C$n$–1 with their final desired pitch at the output from die A$n$, the pitch direction being reverse from that of the outermost layer of strands in the pretwisted core C$n$–1, and the pitch value being independently adjustable by means of speed variator V$n$. The resulting cable C$n$ having $n$ layers of strands therein is fed around the second part of dual frame L$n$ while revolving about its own axis at the rate $N_n$, and is stationary in rotation as it leaves the revolving frame L$n$ of unit 402n.

The receiver unit 403 is of conventional construction including a takeup reel or drum T driven from a power source not shown. A capstan K may be interposed ahead of takeup drum T as shown, or at any other position between adjacent units such as 402, to apply a draft force to the cable.

Further, between any adjacent pair of twisting units 402a through 402n, there may be interposed any number of tape-wrapping or lapping units of conventional type.

While the system of FIG. 14 is shown as comprising reels as the takeoff means for the individual strands of the cable in each unit, it is clear that coil drums may be used instead if desired and as described in connection with other embodiments.

The system just described makes it possible to produce continuously and in a single run a cable having any desired number of layers of alternating pitch direction of separately selectable pitch value. Where the number of desired layers is $n$, there are provided between the input or core-pretwisting unit 401 and the receiver assembly 403 a number ($n$–1) of intermediate twisting units such as 402. As indicated by the arrows F1 through F$n$, the directions of rotation in the successive units are alternately reversed. The pitch length of the layer applied in each unit is separately adjustable by means of the speed variators V2 through V$n$.

As will be understood from the foregoing description an important aspect of the invention relates to the proper determination of the minimum radius of curvature impartable to the looped path of the flexible element in its revolving frame, without impeding free rotation of the element about its own axis. As earlier indicated it is desirable that the transverse or radial dimension of the revolving frame be held to a minimum value as permitted by the diameter of the takeoff reel or takeup reel around which the frame revolves, since this will permit increasing the angular velocity impartable to the frame without incurring dangerously high centrifugal strains in the machine. As also explained earlier herein, the invention requires that the looped path of the flexible element around the revolving frame shall at no point present a radius of curvature so low that it would impede substantially free rotation of the element about its own axis. The importance of an accurate determination of this minimum radius of curvature is hence apparent. Generally, the minimum radius of curvature will obtain in the semi-circular portion of the looped path just ahead of the outlet end of said path towards a takeup reel, or just beyond the inlet end of the path from a takeoff reel.

The flexible elements, wires, ropes, cables and the like, to which the invention is applicable may differ very greatly in their flexibility depending on their size and construction. In the case of a relatively stiff cable the minimum curvature radius usable according to the invention will clearly have a greater value than in the case of a more flexible element since the internal strains or tensions set up in the body of the element and tending to oppose its rotation are higher in the first case.

In view of the above, it is contemplated that in the practical applications of the present invention in cable-making plant and the like, in which cables of widely differing sizes and flexibilities may have to be made and processed, there will be provided a range of machines in which the revolving frames will have a series of curvature radii varying over a suitably broad range. In the manufacture of a particular cable, there will then be utilized the particular machine wherein the curvature radius has the minimum value permissible in view of the stiffness characteristics of that particular cable, in order to benefit from the advantages accruing from minimum transverse dimensions, as explained above.

Figure 15:
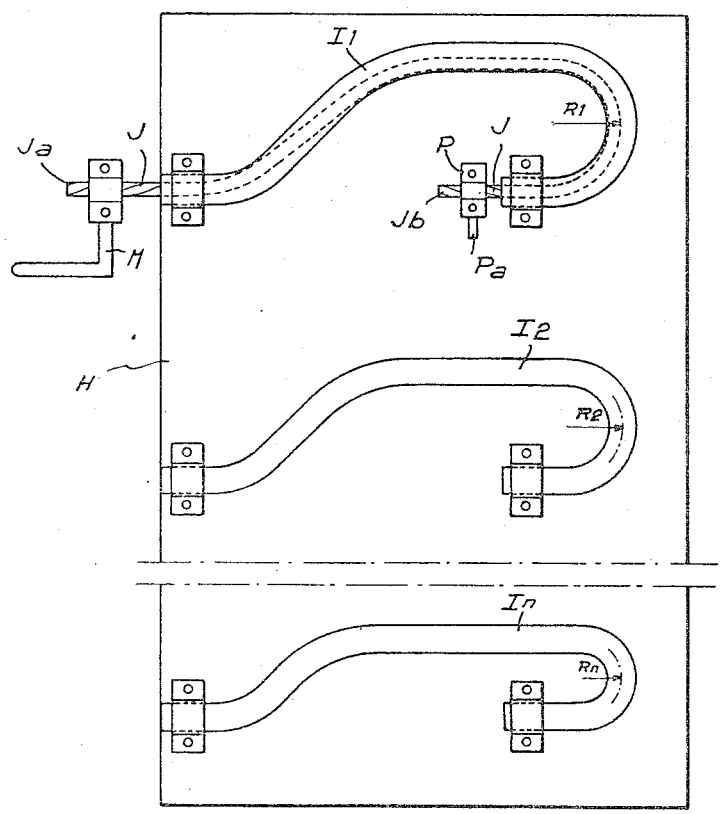
FIG. 15 is a plan view of a gauging device useful in practicing the invention.

FIG. 15 illustrates a form of testing apparatus conveniently usable according to the invention in predetermining the minimum permissible curvature radius permissible for a particular cable. The apparatus shown comprises a support H to a side of which are secured a number of tubes such as I1, I2, I$n$, each in the general form of the looped path described by the cables in the revolving frames of the invention. The tubes I are provided with smooth internal surfaces having diameters corresponding e.g. to the largest size cables to be manufactured with the range of machines available in the plant. The tubes each respectively correspond to a particular machine and they differ in curvature radius in their arcuate end portion, such radius having an incrementally decreasing value R1, R2 through R$n$, from each tube to the next.

In testing a particular cable, a suitable length of the cable J is threaded through a tube such as I1 so that the ends of the cable protrude from the opposite ends of the tube as at J$a$ and J$b$. A crank M or the like is fixedly secured to the protruding end Ja, and a clamp P having a perpendicularly projecting index Pa is secured to the other protruding end Jb. Crank M is rotated, manually or otherwise, in the same direction as that of the outermost lay of strands in the cable J, so as to impart a selected number of turns to the cable end Ja. At the same time the index Pa is watched to check whether the cable end Jb has rotated by the same number of turns. If this is the case, the cable J is withdrawn from tube I1 and inserted through the tube such as I2 having the next smaller curvature radius value, and the test is repeated. When it is found that the marker index Pa rotates less than the number of turns imparted to crank M, this indicates that the tube in which this fact is first noted has too small a radius of curvature for the cable under test, and the curvature radius of the immediately preceding tube of the series is selected for use. Obviously in the case of cables of sufficient stiffness, the actuating handle and marker index may be omitted and replaced by bends at the ends of the cable. Further, the testing apparatus described can easily be mechanized if desired.

A great number of modifications in and departures from the exemplary embodiments disclosed herein can be made while still remaining within the scope of the invention. As will now be understood, the invention basically provides improved apparatus for modifying or controlling the degree of twist in a flexible elongated element capable of transmitting torsion forces such as a rope, cable, wire, strand, or the like. Thus the invention may serve either to impart twist to such an element or to remove twist therefrom, depending on requirements. In most cases it will be found convenient to apply the twist-modifying or -controlling process of the invention to a cable-like element while such element is being fed in an axial direction, as during cable-making operations. Fundamentally, however, the principles of the invention do not depend on any axial feed displacement of the element, and it is entirely conceivable that the invention can be used for modifying or controlling the twist of a cable-like element which is not being subjected to axial displacement at the time, where this may be found convenient.

The expressions "ahead of" and "beyond," where used in the claims, are to be interpreted with reference to the direction of feed of the cable-like element.

What I claim is:

1. Apparatus for imparting differential rotation to spaced sections of a flexible cable-like element about the axis of the element whereby to control the degree of twist present in said element, which apparatus comprises guide means constraining the element to follow a curved path having coaxial end portions extending in a common direction, said path having at all points thereof a radius of curvature greater than the radius above which smooth bodily rotation of the element about its own axis is permitted, means for rotating the constraining means about the common axis of said end portions, and including means for inducing rotation of the element about its own axis throughout the extent of said path, whereby to impart to the section of the element present at one end portion of the path an angular velocity differing from that of the section of the element present at the other end portion of the path.

2. The apparatus defined in claim 1 wherein said rotation-inducing means comprise spaced rollers carried by said guide means and in engagement with said element along said path.

3. In apparatus for feeding a cable-like element, the combination of rotatable guide means constraining said element to follow a curved path having coaxially aligned end portions extending in a common direction and having at all points thereof between said end portions a radius of curvature greater than the radius above which smooth bodily rotation of the element about its own axis is permitted, means for rotating the guide means about the common axis of said end portions, said guide means including means inducing bodily rotation of the element about its own axis throughout the extent of said path whereby to impart to the section of the element present at one end portion of the path an angular velocity differing from that of the section of the element present at said other end portion, and means for feeding said element axially from one towards the other end portion of said path.

4. The apparatus defined in claim 3 wherein said guide means includes rotatable rollers spaced along said path and engageable with said element for inducing bodily rotation thereof.

5. The apparatus defined in claim 4 wherein said roller means are canted so that rotation thereof induced by the axial feed of the element will in turn induce rotation of the element.

6. In cable-making apparatus the combination comprising rotatable cable guide means defining a curved path having coaxially aligned spaced end portions extending in a common direction, and having at all points thereof a curvature radius greater than that above which bodily rotation of said cable about its axis is permitted, said guide means inducing bodily rotation of the cable throughout the extent of said path, means for rotating said guide means about the common axis of said end portions, an input die positioned ahead of and coaxially with an input one of said end portions of the path, means for feeding a plurality of cable component elements simultaneously through said die into said input end portion of the path to be twisted into said cable in said input end portion, and means positioned beyond the other end portion of said path for taking up the resulting cable.

7. In a cable making apparatus including an input die, means for feeding a plurality of cable component elements simultaneously into said die, and cable twisting means positioned beyond said die and rotatable about an axis coaxial therewith for twisting said elements into a cable; the provision of apparatus for feeding at least one of said component elements into said die while controlling the twist characteristic thereof, said apparatus comprising rotatable guide means positioned ahead of said die and defining a curved path having coaxially aligned spaced end portions extending in a common direction and having at all points thereof a curvature radius greater than that above which bodily rotation of said component element about its own axis is permitted, means for rotating said guide means about the common axis of said end portions, and means for feeding said one component element over said path from an input one to an output one of said end portions thereof and thence into said die while inducing bodily rotation of said component element about its own axis.

8. The apparatus defined in claim 7 wherein said twisting means comprises rotatable cable guide means defining a curved path having spaced aligned end portions coaxial with said die and extending in a common direction and having at all points thereof a curvature radius greater than that above which bodily rotation of said cable about its own axis is permitted, and means for rotating said cable guide means about said common axis while inducing bodily rotation of said cable about its own axis throughout the extent of said curved path thereof.

9. The apparatus defined in claim 7 wherein said one component element is a core element for said cable and wherein said end portions of said path are coaxial with said die.

10. The apparatus defined in claim 7 wherein means is provided for feeding each of a plurality of outer component elements for said cable into said die.

11. The apparatus defined in claim 6 wherein said cable take-up means comprises a take-up coil and including means for supporting said coil between said end portions in such manner that the coil does not participate in the rotation of said guide means about said common axis.

12. The apparatus defined in claim 7 wherein said means for feeding said one component element comprises a take-off coil and including means for supporting said coil between said end portions in such manner that the coil does not participate in the rotation of the related guide means about said common axis.

13. The apparatus defined in claim 3 including means for rotating said element about its own axis ahead of the point it is fed into said one end portion of the path and wherein said guide means is rotated at an angular velocity one-half that of said element and in the same sense whereby said element is substantially non-rotating at said other end portion of the path.

14. The apparatus defined in claim 3 wherein said guide means includes a linear series of concave rollers engageable with said element and spaced along said path and means mounting said rollers so that their axes of rotation lie at an angle to the axial feed direction of the element.

15. The apparatus defined in claim 3 wherein said guide means includes a linear series of pairs of rollers engageable with said element and spaced along said path and means mounting said pairs of rollers so that the axes of rotation of both rollers of each pair lie at opposite angles to the axial direction of the element.

16. Apparatus for feeding a cable-like element comprising rotatable guide means constraining said element to follow a path including an axial input end portion followed by a radially diverging portion and an output end portion coaxially aligned with and spaced from said input end portion and extending in the same direction, said element being unconstrained over an intermediate portion of said path between said diverging portion and said output end portion, means for rotating the guide means about the common axis of said end portions whereby the element will belly out under centrifugal force into a large radius loop in said intermediate unconstrained portion thereof so as to allow the element to revolve bodily about its own axis throughout said path, and means for feeding the element axially from said input towards said output end of the path whereby to impart differential rotation to the section of said element present at said end portion of the path and control the degree of twist in said element.

17. The apparatus defined in claim 16 wherein said axis is vertical.

18. The apparatus defined in claim 16 including take-up coil means for said element beyond said output end of the path and means supporting said coil means independently of the rotation of said guide means.

19. The apparatus defined in claim 18 including means sensing departure of the maximum transverse dimension of the loop assumed by said element from a prescribed dimension by an amount exceeding a prescribed amount and means controlled by said sensing means for varying the relative velocity of said feed with respect to the rotation of said take-up coil so as to maintain said maximum transverse dimension within prescribed limits.

20. In a cable-making apparatus the combination comprising rotatable guide means defining a first and a second curved path each having aligned axially spaced end portions extending in a common direction and disposed to permit continuous feed of a cable-like element over said first then over said second path; each of said paths having at all points thereof a curvature radius great enough to permit bodily rotation of said element about its own axis; a first input die positioned ahead of and adjacent an input end portion of said first path; a second input die positioned ahead of and adjacent to an input end portion of said second path; means for feeding a cable core element through said first die into said first path; means for feeding a plurality of outer cable component elements simultaneously with said core element issuing from said first path through said second die and into said second path; and means for bodily rotating said guiding means whereby to twist said component elements about said core into a resulting cable issuing from the output end portion of said second path.

21. The apparatus defined in claim 20 including means for supporting said component element-feeding means within said guide means adjacent the axis thereof in such manner that said feeding means does not participate in the bodily rotation of said guiding means.

22. A multilayer cable making apparatus which comprises a plurality of units arranged in series and each unit constituted by the combination claimed in claim 20 and further including means for feeding the resulting cable issuing from the output end portion of the second path of one unit into the first input die of a succeeding unit to constitute said core element in said succeeding unit.

23. The apparatus defined in claim 22 and further comprising means for rotating the guiding means of alternate of said units in reverse senses, and including means for separately adjusting the angular speeds of the guiding means of each unit.

References Cited by the Examiner

UNITED STATES PATENTS

| | | | |
|---|---|---|---|
| 1,907,551 | 5/1933 | Kraft | 57—60 X |
| 2,056,470 | 10/1936 | Kraft | 57—58.33 X |
| 2,254,895 | 9/1941 | Johnston | 57—59 X |
| 2,374,133 | 4/1945 | Ramstedt | 57—111.5 |
| 2,457,402 | 12/1948 | Roetting | 57—58.36 |
| 2,689,447 | 9/1954 | Bruestle | 57—58.36 |
| 2,723,525 | 11/1955 | Blaisdell | 57—58.36 |
| 2,841,514 | 7/1958 | Norblad | 57—58.3 X |
| 2,877,620 | 3/1959 | Blaisdell | 57—59 X |
| 2,910,823 | 11/1959 | Bunch | 57—58.83 X |
| 3,142,952 | 8/1964 | Kraft et al. | 57—58.83 X |
| 3,196,601 | 7/1965 | Havgwitz | 57—106 X |

FOREIGN PATENTS 553,645    5/1943    Great Britain.

FRANK J. COHEN, *Primary Examiner.*

D. E. WATKINS, *Assistant Examiner.*